United States Patent [19]

Matsui et al.

[11] Patent Number: 5,162,160
[45] Date of Patent: * Nov. 10, 1992

[54] FLUORESCENT SCREEN

[75] Inventors: Fumio Matsui; Yasushi Murata; Satoru Tanaka, all of Saitama, Japan

[73] Assignee: Pioneer Electronic Corporation, Tokyo, Japan

[*] Notice: The portion of the term of this patent subsequent to Sep. 3, 2008 has been disclaimed.

[21] Appl. No.: 504,858

[22] Filed: Apr. 5, 1990

[30] Foreign Application Priority Data

Jul. 24, 1989 [JP] Japan .................... P1-190816

[51] Int. Cl.⁵ .............................. G01T 1/20
[52] U.S. Cl. ........................ 428/690; 427/157; 427/65; 156/67; 250/487.1; 250/483.1; 250/484.1; 250/486.1; 428/917; 428/225; 428/236; 428/245; 428/375; 428/365; 428/290
[58] Field of Search ............ 250/483.1, 484.1, 486.1, 250/487.1; 428/690, 917, 224, 225, 233, 235, 236, 245, 375, 365, 274, 290; 427/157, 65; 156/67

[56] References Cited

U.S. PATENT DOCUMENTS

| | | | |
|---|---|---|---|
| 4,608,301 | 8/1986 | Ishizuka et al. | 428/328 |
| 4,916,321 | 4/1990 | Shiraishi | 250/484.1 |
| 5,045,706 | 9/1991 | Tanaka et al. | 250/483.1 |

*Primary Examiner*—Ellis P. Robinson
*Assistant Examiner*—Charles R. Nold
*Attorney, Agent, or Firm*—Foley & Lardner

[57] ABSTRACT

A fluorescent screen includes a substrate made of a light-scattering material and a mixture of an organic fluorescent substance and a binder dispersed therein. Since the luminescent light is scattered by the light-scattering material, the light emitted from the screen is increased to a level higher than that of a conventional fluorescent screen to enhance brightness thereof.

8 Claims, 2 Drawing Sheets stimulating light

FLUORESCENT SCREEN

BACKGROUND OF THE INVENTION

1. Field of the Invention

The present invention relates to a fluorescent screen, and more particularly to a fluorescent screen containing an organic substance capable of emitting visible light when activated by stimulating light impinging thereto.

2. Description of the Prior Art

There is known a display system having a fluorescent screen which comprises a flat plate made of a transparent plastic containing a fluorescent substance which fluoresces (or phosphoresces) when activated by stimulating light impinging thereto such as ultraviolet light, visible light, near-infrared radiation, or the like. The fluorescent substance is for example a piperidinium tetra benzoyltrifluoroacetone europium complex as disclosed in Japanese patent application Laid-Open No. 63-191884. When a scanning beam of stimulating light is impinged onto the fluorescent screen in such a manner that it forms a minute spot on the screen, the fluorescent substance existing within the spot emits light. The spot plays the role of a picture element, a plurality of which display an image.

Such a known fluorescent screen is utilized for a display segment used in an image display device of a rear-projection or front-projection type. In the rear-projection type, the scanning beam of stimulating light is applied onto the back side of the fluorescent screen immediately after luminescent light is allowed to pass through the front side thereof toward an observer's eyes. In the front-projection image display device, the beam of stimulating light is impinged onto the front side of the fluorescent screen immediately after luminescent light is allowed to pass through the same front side thereof toward an observer's eyes.

As shown in FIG. 1 of the accompanying drawings, when a beam of stimulating light is applied onto the back side surface 20b of a fluorescent screen 20, the luminescent light emitted from a fluorescent substance 21 is scattered in every direction as indicated by the broken lines. Since the fluorescent screen has generally been in the form of a transparent plastic plate having smooth surfaces, most of the emitted luminescent light is totally reflected between the interfacial surfaces of the fluorescent screen 20 and then laterally propagated within the fluorescent screen 20 although only one part of the emitted luminescent light goes out form the display side surface 20a of the fluorescent screen 20. Therefore, the quantity of luminescent light to be actually emitted from the fluorescent screen 20 is small in comparison with the level of the applied stimulating light, so that the conversion efficiency from the irradiated stimulating light into the emitted luminescent light is low. The intensity of luminescent light emitted toward the display side of the fluorescent screen is so low that the screen as viewed by the observer is relatively dark.

SUMMARY OF THE INVENTION

In view of the aforesaid drawbacks of the conventional fluorescent screen, it is an object of the present invention to provide a fluorescent screen which emits luminescent light of an increased intensity therefrom for a greater degree of screen brightness in response to a reference intensity of luminescent light applied to the screen.

A fluorescent screen according to the present invention comprises a substrate made of a light-scattering material which is capable of scattering light, and a mixture of an organic fluorescent substance and a binder dispersed in the substrate.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
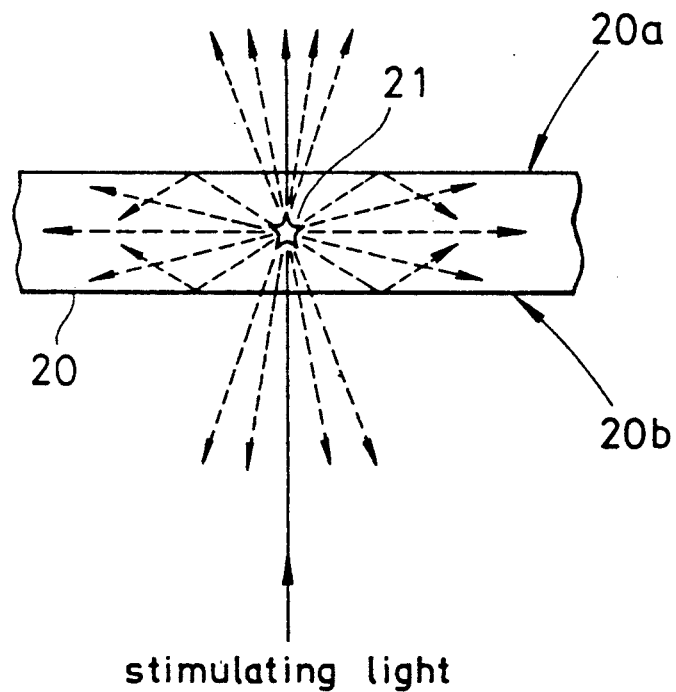
FIG. 1 is a schematic cross sectional view showing the structure of the conventional fluorescent screen.
Figure 2:
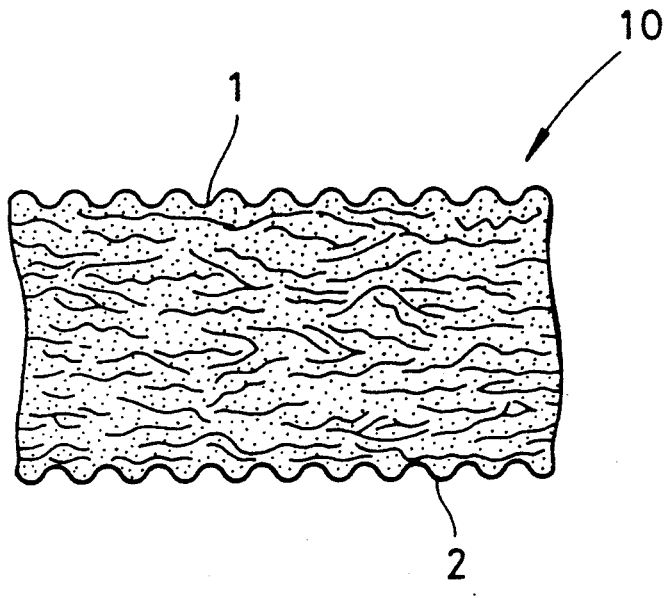
FIG. 2 is a schematic cross sectional view showing the structure of an embodiment according to the present invention.

FIG. 2 shows a fluorescent screen 10 of the embodiment which comprises a substrate 2 made of a light-scattering material which is capable of scattering light and a mixture 1 of an organic fluorescent substance and a binder dispersed in the substrate. The light-scattering material is for example fiber, minute particles or the like. The binder is for example synthetic resin, rubber or the like.

The fluorescent screen is manufactured thorough the following steps.

First of all, a fluorescent substance of 5.9 mg of piperidinium tetra benzoyltrifluoroacetone europium complex and a binder of 8.9 g of monomers or oligomers for polymethylmethacrylate (PMMA) are added to a solvent of 111.2 g of 1,2-dichloroethane. This fluorescent substance emits red light when it is activated by irradiated ultraviolet light but not by visible light. A bonding agent of F-100-B (Reg.) provided by Kyowa gas kagaku kogyou kabusiki kaisya is used for this binder, for example. The solution including the organic fluorescent substance and the binder is then uniformly stirred and the mixture of the fluorescent substance and the binder is obtained.

A rectangular piece (14 cm × 12 cm) of Whatman filter paper (reg.) of No. 2 is used for a substrate to carry the solution. This paper piece is placed in a vat. The solution above mentioned is evenly poured onto the paper piece which is immersed therein. The solution then enters and disperses between fibers constructing the filter paper. Instead of the filter paper, a plate made of a material capable of scattering light such as paper, textile fabric, knitted goods, non-woven fabric or the like may be used for the substrate.

The filter paper carrying the solution is hung by a hook and left alone to dry at a predetermined temperature during a predetermined time period to remove the solvent therefrom. In this time period, polymerization of the binder proceeds to be solidified. The organic fluorescent substance is fixed to the fibers of the filter paper by means of the solidified binder. In this case, the filter paper is preferably maintained in vertical to the ground in such a manner that one straight edge of the filter paper is horizontally supported by the hook. In this way, the fluorescent screen is manufactured.

Figure 3:
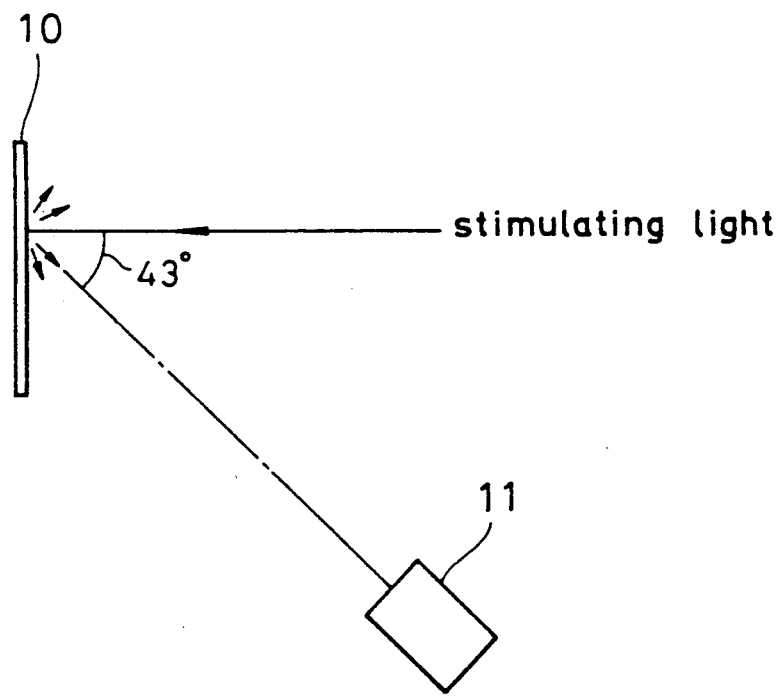
FIG. 3 is a schematic view showing a method of measuring luminance brightness of the fluorescent screen.

Luminance brightness of the obtained fluorescent screen of embodiment is measured. Luminance brightness of a conventional fluorescent screen is also measured for comparison therebetween. This conventional fluorescent screen is a plastic plate having a thickness of 0.5 mm made of PMMA including the same organic fluorescent substance as used in the above mentioned screen at the concentration of 0.06 parts by weight. In the measurement of luminance brightness, each of the samples of these screen is disposed in such a manner that a beam of stimulating ultraviolet light having a reference level is impinged onto the surface in perpendicular thereto, as shown in FIG. 3. Luminance brightness on the light spot formed by the stimulating light beam is measured by means of a luminance-brightness-detecting device 11 disposed in the direction of an angle of 43 degree to the stimulating beam. As a result, luminance brightness of the light spot of the embodiment is 17.1 $cd/m^2$. Luminance brightness of the spot of the conventional fluorescent screen is 37.6 $cd/m^2$. In this way, the fluorescent screen according to the present invention is improved in the screen brightness in comparison with the conventional fluorescent screen.

According to the present invention, the fluorescent screen includes a substrate made of a light-scattering material and a mixture of an organic fluorescent substance and a binder dispersed in the material. The light-scattering material scatters the luminescent light emitted from the fluorescent substance and prevents from propagation of the light in the fluorescent screen. Therefore, the intensity of luminescent light emitted from the display surface of the fluorescent screen is increased. The screen brightness with respect to a reference intensity level of stimulating light is increased to a level of about 22.2 times higher than that of the conventional fluorescent screen.

What is claimed is:

1. A fluorescent screen adapted for use as a display segment in a display device, comprising:
    a substrate made of a fibrous light-scattering material, and a filling mixture of an organic fluorescent substance and a binder evenly dispersed within said fibrous light-scattering material.

2. A fluorescent screen as claimed in claim 1, in which said fibrous light-scattering material is selected from the group consisting of a paper and a textile fabric.

3. A fluorescent screen as claimed in claim 2, in which said binder is polymethylmethacrylate.

4. A method for manufacturing a fluorescent screen adapted for use as a display segment in a display device, comprising the steps of:
    preparing a substrate formed of a fibrous light-scattering material,
    preparing a uniform solution comprising a solvent and a mixture which comprises an organic fluorescent substance and a binder,
    immersing said substrate into said solution, and
    drying said substrate to remove said solvent therefrom so that said mixture is evenly dispersed within said fibrous light-scattering material.

5. A method for manufacturing a fluorescent screen as claimed in claim 4, in which said fibrous light-scattering material is selected from the group consisting of a paper and a textile fabric.

6. A method for manufacturing a fluorescent screen as claimed in claim 5, in which said binder is polymethylmethacrylate.

7. A fluorescent screen as claimed in claim 1, in which said fibrous light-scattering material is selected from the group consisting of knitted goods and a non-woven fabric.

8. A method for manufacturing a fluorescent screen as claimed in claim 4, in which said fibrous light-scattering material is selected from the group consisting of knitted goods and a non-woven fabric.

* * * * *